2,830,072

PROCESS FOR THE PREPARATION OF ω-AMINO ALKANE NITRILES

Johan W. Garritsen, Geleen, and Johannes H. Ottenheym, Sittard, Netherlands, assignors to Stamicarbon N. V., Heerlen, Netherlands No Drawing. Application December 28, 1956
Serial No. 631,013

Claims priority, application Netherlands
December 31, 1955

12 Claims. (Cl. 260—465.5)

The present invention relates to the preparation of ω-amino-alkane nitriles by dehydration of lactams.

It is known that the dehydration of ε-caprolactam may be effected by passing the lactam in the vapor phase together with ammonia over a catalyst consisting of copper on silica gel. However, the yield of ω-amino capronitrile obtained by this process is only 25%.

It is also known that the yield of ω-amino capronitrile obtained by this dehydration, can be increased to about 50% if a mixture of activated alumina and copper on pumice is used as the catalyst and the temperature is kept at 360° C. for 0.1 minute using 6 mols of ammonia per mol of lactam.

The yields of ω-aminonitrile obtainable by these processes are too low to permit the ω-amino capronitrile to be prepared on an industrial scale. Furthermore, there is too much by-product formation.

It is an object of the present invention to prepare ω-amino-alkane nitriles from lactams by a process which gives increased yields of the amino alkane nitriles.

Another object of the invention is to prepare ω-amino alkane nitriles from lactams by a method which substantially eliminates by-product formation.

A further object is to prepare ω-amino capronitrile from caprolactam by a novel and more efficient process.

An additional object is to accelerate the formation of ω-amino alkane nitriles from lactams while at the same time preventing a reduction in overall yield of the lactam and also preventing an increase in by-product formation.

Yet another object is to devise an improved method of dehydrating lactams to ω-amino alkane nitriles using a substantially neutral dehydrating agent.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In an attempt to improve the yield of ω-amino alkane nitrile the prior art process using activated alumina and copper was carried out with the temperature increased to above 400° C. The result was that while the dehydration was accelerated, the yield of ω-amino capronitrile dropped to below 40% while simultaneously an increase in by-products was obtained.

Dehydration catalysts may be divided into three broad classes:

(a) Catalysts which are acidic in water, such as boron phosphate, clay treated with acid (e. g., bentonite treated with hydrochloric acid), phosphoric acid on a carrier, e. g., on kieselguhr, fuller's earth or silica;

(b) Catalysts which are approximately neutral in water, such as kaolin, activated alumina;

(c) Catalysts which are alkaline in water, such as the oxides of the alkaline-earth metals, e. g., calcium oxide and barium oxide.

It has been found that catalysts of these different classes do not always possess the same dehydrating properties and particularly that in the preparation of ω-amino alkane nitriles from lactams the character of the dehydration products varies with change in the class of catalyst used.

It has also been found that ω-amino alkane nitriles may be obtained in good yields and the objects of the present invention attained by dehydration of the corresponding lactams in the presence of an excess of ammonia using a dehydration catalyst which is approximately neutral in water, if the period of contact of the lactam with the catalyst is not too long.

The process of producing ω-amino alkane nitrile according to this invention by dehydration of the corresponding lactam in the presence of an excess of ammonia, comprises passing the lactam in the vapor phase together with ammonia, at a temperature of 250–400° C., over a dehydration catalyst which is approximately neutral in water, the time of contact with the catalyst being adjusted so as to avoid the formation of an undesired proportion of by-products.

With the process according to the invention, water is produced by the dehydration while the ω-amino alkane nitrile formed contains as many carbon atoms in the molecule as the original lactam.

The dehydration may be effected at atmospheric pressure and there is no appreciable advantage in using higher pressures so that the apparatus employed need not be of a kind suitable for working under high pressures. Normally, the process is carried out at about 0.5 atmosphere gauge pressure merely to force the vapor through a reaction chamber filled with the catalyst. However, the vapor can be passed through the reaction chamber by suction, in which case the pressure may be reduced below atmospheric pressure, e. g., to about half atmospheric.

The dehydration catalyst, e. g., kaolin or activated alumina, is preferably used in the form of pellets or irregular lumps with a mean diameter of 3–6 mm. and introduced into the reaction chamber in a sufficient quantity to permit the process to be carried out by passing the vapor through the mass of catalyst. The activity of the catalyst can be maintained in a simple manner by intermittently passing air through the catalyst mass instead of lactam and ammonia.

In general, it has been found that the time during which the lactam vapor and the catalyst are in contact should be less than 10 seconds, e. g., 0.25 to 8 seconds. In any particular case, an increase in the contact time beyond a certain point, while giving a greater conversion of the lactam, nevertheless involves an undesirable increase in the formation of undesired by-products. When activated alumina is employed as the catalyst, it is preferred to use a contact time of only ¼ to 1½ seconds. With other catalysts, such as kaolin, it is preferred to use a somewhat longer contact period, e. g., 4–8 seconds.

Good results have been obtained using as little as 5 mols of ammonia for every mol of lactam, but the minimum quantity required will depend to some extent on the temperature. An increase in the quantity of ammonia, e. g., to 15, 20, 30, 55, 80, 100 or even more mols for every mol of lactam has a favorable effect on the dehydration so that more lactam is converted while at the same time serving to oppose an increase in formation of by-products. The upper limit on the amount of ammonia is controlled primarily by economic considerations.

Usually, the dehydration is carried out at about 325–375° C. The use of the higher temperatures within this range, for example, 350–375° C., gives a higher conversion. If there is a tendency at these higher temperatures for an undesirable proportion of by-products to form, this tendency may be checked by an increase in the amount of ammonia. At temperatures below 250° C., there is insufficient dehydration, while above 400° C., the formation of undesired by-products becomes predominant.

Preferably, in carrying out the invention, the lactam vapor and ammonia are previously mixed before passing over the catalyst by passing preheated ammonia through molten lactam, or by passing a stream of molten lactam in downward direction through a heated vaporization chamber so as to bring it in contact with the ammonia gas ascending in said chamber.

The ammonia can be separated from the vapors issuing from the reaction chamber by condensation of the reaction products, after which the ammonia can be re-used and re-introduced into the vaporization chamber.

The liquid reaction product consists mainly of $\omega$-amino alkane nitrile and non-converted lactam.

In the specification and claims, unless otherwise stated, all parts and percentages are by weight.

*Example 1*

A tube 3 cm. in diameter and 60 cm. in length is filled with kaolin particles with a mean diameter of 3–5 mm.

$\epsilon$-Caprolactam vapor and ammonia in the ratio of 20 mols of ammonia for every mol of lactam were mixed by passing ammonia heated to 358–360° C. through molten lactam at 100° C. and then were continuously passed through this tube at a temperature of 358–360° C. and a space velocity of 218 litres (calculated at 0° C. and 1 at.) per litre of catalyst per hour; the average contact time, therefore, was 7 seconds.

The vapors issuing from the tube were cooled to below 50° C. to condense the liquid reaction product and separate it from the gas.

An analysis of the reaction product carried out upon removal of the reaction water showed that 66.3% of the caprolactam had been converted and that the converted product contained 96% by weight of $\omega$-aminohexane nitrile.

*Example 2*

The same tube used in Example 1 was used with activated alumina as catalyst.

$\epsilon$-Caprolactam vapor and ammonia, in the ratio of 12 mols of ammonia for every mol of lactam were mixed as in Example 1 and were then continuously passed through the reaction tube filled with alumina pellets (diameter 3 mm., thickness 2 mm.) at a temperature of 340° C. and a space velocity of 3080 litres (calculated at 0°C and 1 at.) per litre catalyst per hour; the contact time, therefore, was ½ second.

An analysis of the liquid reaction product obtained upon condensation and removal of the reaction water showed that 53.2% of the caprolactam has been converted and that the converted product contained 97% by weight of $\omega$-amino-hexane nitrile.

In the specific examples, caprolactam was used as the starting material and $\omega$-amino-hexane nitrile was obtained as the product of reaction.

In place of caprolactam in the examples, there can be used other lactams to obtain the corresponding $\omega$-amino alkane nitriles, e. g., caprylolactam can be used to form $\omega$-amino octane-nitrile; butyrolactam (2-pyrrolidone) can be used to form $\omega$-amino butane-nitrile; valerolactam can be used to form $\omega$-amino pentane-nitrile, and oenantolactam can be used to form $\omega$-amino heptane-nitrile. In fact, there can be used lactams having as many as 10 carbon atoms, such as $\omega$-caprinolactam, to form the corresponding $\omega$-amino decane nitrile.

The nitriles obtained according to the present invention can be converted to the corresponding alkylene diamines by hydrogenation to thus give products which are useful for forming nylon-type plastics, etc.

We claim:

1. A process for the production of $\omega$-amino alkane nitriles comprising dehydrating the corresponding lactams in the presence of an excess of ammonia in the vapor phase at a temperature of 250–400° C. with the aid of a dehydration catalyst selected from the group consisting of activated alumina and kaolin.

2. A process according to claim 1 wherein the time of contact with the catalyst is less than 10 seconds.

3. A process according to claim 1 wherein the lactam has 4 to 7 carbon atoms.

4. A process according to claim 1 wherein the lactam is $\epsilon$-caprolactam and the $\omega$-amino alkane nitrile formed is $\omega$-amino hexane nitrile.

5. A process according to claim 4 wherein the catalyst is activated alumina.

6. A process according to claim 5 wherein the time of contact with the catalyst is 0.25 to 1.5 seconds.

7. A process according to claim 4 wherein the catalyst is kaolin.

8. A process according to claim 7 wherein the time of contact with the catalyst is 4 to 8 seconds.

9. A process according to claim 1 wherein the temperature is 325–375° C., the catalyst is selected from the group consisting of activated alumina and kaolin, the time of contact with the catalyst is between about 0.25 and 8 seconds and 5 to 100 mols of ammonia are used per mol of lactam.

10. A process according to claim 9 wherein the lactam is $\epsilon$-caprolactam.

11. A process for preparing $\omega$-amino hexane nitrile comprising continuously passing a mixture of $\epsilon$-caprolactam and ammonia in the ratio of 20 mols of ammonia per mol of lactam at a temperature of 358–360° C. and a space velocity of 218 litres per litre of catalyst per hour through a zone filled with kaolin as a catalyst, cooling the vapors issuing from the reaction zone to condense a liquid reaction product and recovering $\omega$-amino hexane nitrile from the liquid reaction product.

12. A process for preparing $\omega$-amino hexane nitrile comprising continuously passing a mixture of $\epsilon$-caprolactam and ammonia in the ratio of 12 mols of ammonia per mol of lactam at a temperature of 340° C. and a space velocity of 3080 litres per litre of catalyst per hour through a zone filled with activated alumina as a catalyst, cooling the vapors issuing from the reaction zone to condense a liquid reaction product and recovering $\omega$-amino hexane nitrile from the liquid reaction product.

References Cited in the file of this patent

UNITED STATES PATENTS

| 2,234,566 | Lazier et al. | Mar. 11, 1941 |
| 2,404,280 | Dutcher | July 16, 1946 |

FOREIGN PATENTS

| 883,155 | Germany | July 16, 1953 |